(12) United States Patent
Yu

(10) Patent No.: US 9,753,914 B2
(45) Date of Patent: *Sep. 5, 2017

(54) NATURAL EXPRESSION PROCESSING METHOD, PROCESSING AND RESPONSE METHOD, DEVICE, AND SYSTEM

(71) Applicant: Zili Yu, Shanghai (CN)

(72) Inventor: Zili Yu, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,576

(22) Filed: Apr. 28, 2016

(65) Prior Publication Data

US 2016/0253434 A1    Sep. 1, 2016

Related U.S. Application Data

(63) Continuation of application No. 15/032,603, filed as application No. PCT/CN2014/079945 on Jun. 16, 2014.

(30) Foreign Application Priority Data

Oct. 28, 2013   (CN) .......................... 2013 1 0516340

(51) Int. Cl.
*G10L 15/22*     (2006.01)
*G06F 17/27*     (2006.01)
(Continued)

(52) U.S. Cl.
CPC ........ *G06F 17/2785* (2013.01); *G06F 17/289* (2013.01); *G06F 17/2809* (2013.01);
(Continued)

(58) Field of Classification Search
CPC .. G06F 17/289; G06F 17/2827; G06F 17/271; G06F 17/2872; G06F 17/274;
(Continued)

(56) References Cited

U.S. PATENT DOCUMENTS 4,599,691 A * 7/1986 Sakaki ................. G06F 17/271
                                                         704/2
5,278,980 A * 1/1994 Pedersen ........... G06F 17/30011
                                                      707/999.004
(Continued)

FOREIGN PATENT DOCUMENTS

CN          1489086 A      4/2004
CN        103593340 A      2/2014
(Continued)

OTHER PUBLICATIONS

PCT International Search Report for corresponding PCT application No. PCT/CN2014/079945, dated Sep. 29, 2014.
(Continued)

*Primary Examiner* — Vijay B Chawan
(74) *Attorney, Agent, or Firm* — McDonnell Boehnen Hulbert & Berghoff LLP

(57) ABSTRACT

A method involves: identifying a natural expression from a user and obtaining a certain form of language information which can be processed by a computer; and converting the identified and obtained language information to a standard expression in an encoded form. According to an example method, a natural expression is converted to an encoded standard expression; conversion to a standard expression is converting the semantics of a natural expression to encoding and parameters; precise verbatim translation is not necessary, thus the requirement for degree of accuracy of machine translation can be reduced; at the same time, the complexity of the database used for expression conversion (machine translation) is reduced, increasing data query and update speed and thus improving smart processing performance. Furthermore, the relatively simple encoded expression reduces the workload for manually-assisted interventions,
(Continued)

increasing the efficiency of the work of manually-assisted interventions.

18 Claims, 6 Drawing Sheets

(51) Int. Cl.
    *G06F 17/28*     (2006.01)
    *G06F 17/30*     (2006.01)
    *G06N 3/00*     (2006.01)
    *G06N 99/00*     (2010.01)
    *G10L 17/24*     (2013.01)

(52) U.S. Cl.
    CPC .... *G06F 17/2836* (2013.01); *G06F 17/30976* (2013.01); *G06N 3/008* (2013.01); *G06N 99/005* (2013.01); *G10L 15/22* (2013.01); *G10L 17/24* (2013.01)

(58) Field of Classification Search
    CPC ............ G06F 17/2755; G06F 17/2785; G06F 17/2775; G06F 17/2881; G06F 17/246; G06F 17/2705; G06F 17/2765; G06F 17/277; G06F 17/279; G06F 17/2836; G06F 17/30011; G06F 17/30646; G06F 17/30684; G10L 15/22; G10L 15/18; G10L 15/1807; G10L 15/1815; G10L 15/1822; G10L 15/183
    USPC .... 704/9, 2, 257, 8, 4, 7, 10, 231, 251, 254, 704/270, 275, 3
    See application file for complete search history.

(56) References Cited

U.S. PATENT DOCUMENTS

| | | | | |
|---|---|---|---|---|
| 5,338,976 | A * | 8/1994 | Anwyl | G06F 17/2872 704/2 |
| 5,369,575 | A * | 11/1994 | Lamberti | G06F 17/274 704/9 |
| 5,386,556 | A * | 1/1995 | Hedin | G06F 17/271 |
| 5,590,039 | A * | 12/1996 | Ikeda | G06F 17/2705 704/2 |
| 5,659,765 | A * | 8/1997 | Nii | G06F 17/271 704/3 |
| 5,734,889 | A * | 3/1998 | Yamaguchi | G06F 17/246 704/9 |
| 5,748,841 | A * | 5/1998 | Morin | G06F 3/16 704/257 |
| 5,761,637 | A * | 6/1998 | Chino | G10L 15/1807 704/231 |
| 5,794,177 | A * | 8/1998 | Carus | G06F 17/274 704/10 |
| 5,909,678 | A * | 6/1999 | Bergman | G06F 17/3064 707/999.004 |
| 6,026,410 | A * | 2/2000 | Allen | G06Q 10/10 |
| 7,222,066 | B1 * | 5/2007 | Oon | G09B 19/04 704/4 |
| 7,873,532 | B2 | 1/2011 | Jones et al. | |
| 7,962,466 | B2 | 6/2011 | Jones et al. | |
| 8,065,286 | B2 | 11/2011 | Jones | |
| 8,117,196 | B2 | 2/2012 | Jones et al. | |
| 8,239,461 | B2 | 8/2012 | Jones et al. | |
| 8,266,130 | B2 | 9/2012 | Jones et al. | |
| 8,280,921 | B2 | 10/2012 | Jones et al. | |
| 8,301,651 | B2 | 10/2012 | Jones et al. | |
| 8,327,270 | B2 | 12/2012 | Jones et al. | |
| 8,818,795 | B1 * | 8/2014 | Cassimatis | G06F 17/2785 704/9 |
| 2002/0178005 | A1 * | 11/2002 | Dusan | G06F 17/271 704/254 |
| 2006/0116876 | A1 | 6/2006 | Marcus | |
| 2007/0299824 | A1 | 12/2007 | Pan et al. | |
| 2012/0063574 | A1 | 3/2012 | Or-Bach et al. | |
| 2012/0109924 | A1 | 5/2012 | Jones et al. | |
| 2012/0185484 | A1 | 7/2012 | Jones et al. | |
| 2013/0278492 | A1 | 10/2013 | Stolarz et al. | |
| 2014/0290138 | A1 * | 10/2014 | Oshima | H04B 10/11 49/25 |
| 2015/0074524 | A1 | 3/2015 | Nicholson et al. | |

FOREIGN PATENT DOCUMENTS

| | | |
|---|---|---|
| JP | 2002108859 A | 4/2001 |
| JP | 2005241971 A | 9/2005 |
| JP | 200624114 A | 1/2006 |
| JP | 2007226642 A | 9/2007 |

OTHER PUBLICATIONS

PCT International Preliminary Report on Patentability, PCT application No. PCT/CN2014/079945, dated May 5, 2016.
Chinese Office Action and English translation issued Dec. 21, 2015 for Chinese Application Serial No. 201310516340.5, filed Oct. 28, 2013, 22 pages.
Canadian Office Action issued May 30, 2016 for Canadian Application Serial No. 2929018, filed Jun. 16, 2014, 5 pages.
Chinese Office Action and English translation issued Aug. 25, 2016 for Chinese Application Serial No. 201310516340.5, filed Oct. 28, 2013, 20 pages.
Japanese Office Action and English translation issued Sep. 13, 2016 for Japanese Application No. 2016-546460, 10 pages.
Canadian Office Action issued Sep. 7, 2016 for Canadian Patent Application No. 2929018, 4 pages.
Russian Office Action and English Translation issued Sep. 5, 2016 for Russian Patent Application No. 2016120612, 3 pages.
Japanese Office Action issued Feb. 28, 2014 for Japanese Patent Application No. 2016-546460, 11 pages.
Canadian Office Action issued Dec. 13, 2016 for Canadian Patent Application No. 2929018, 5 pages.
Canadian Office Action dated May 29, 2017 for Canadian Application No. 2929018, 5 pages.

* cited by examiner

NATURAL EXPRESSION PROCESSING METHOD, PROCESSING AND RESPONSE METHOD, DEVICE, AND SYSTEM

RELATED APPLICATION

This application is a continuation of U.S. application Ser. No. 15/032,603, filed Apr. 27, 2016, which is the national stage of International Application No. PCT/CN2014/079945, filed Jun. 16, 2014, which in turn claims priority to Chinese Application No. CN201310516340.5 filed Oct. 28, 2013, all of which are hereby incorporated by reference in their entirety for all purposes.

TECHNICAL FIELD

The present invention relates to an information processing method, and in particular, relates to a processing method of a natural expression from a human being, a processing and response method for the natural expression, and an information processing device and information processing system using the processing and response method.

BACKGROUND

Machine translation (MT) falls within the scope of computational linguistics, which uses computer programs to translate text or speech expressions from one natural language to another natural language. In a sense, glossary replacements between different natural languages are achieved. Further, with a corpus-based technique, more complex automatic translation can be achieved, thereby better processing different grammatical structures, glossary recognitions, correspondence of idiomatic expressions, etc.

The current machine translation tools can generally allow for the customization on a specific field or profession (such as weather forecast), with an objective of narrowing the translation on the glossary to a proper noun in the specific field, so as to improve the translation result. This technique is particularly effective for some fields that use more formal or more standardized presentation manners. For example, government documents or law related documents are usually more formal and more standardized than other documents using an ordinary literal expression, and accordingly the result of the machine translation for such documents is often better than that of informal documents such as dialogues in daily life.

However, the quality of the machine translation usually depends on the differences between a source language and a target language in terms of glossary, grammar structure, linguistics, and even culture. For example, since both English and Dutch both belong to indogermanische Fmilie, the result of the machine translation between these two languages is often much better than the result of the mutual machine translation between English and Chinese.

Therefore, in order to improve the result of the machine translation, manual intervention is still very important. For example, in some machine translation systems, by manually defining or choosing more suitable words, the accuracy and quality of the machine translation can be dramatically improved.

Some existing translation tools, such as Alta Vista Babelfish, sometimes can obtain understandable translation results. However, if a more meaningful result is desired, it is often necessary to make an appropriate edition when inputting a sentence in order to facilitate the analysis by computer programs.

In general, the purpose of using machine translation by people may only be learning the essence of sentences or paragraphs in an original text, rather than obtaining an accurate translation. Generally speaking, the machine translation has not reached a quality level such that it can be substituted for professional (manual) translation, and still cannot become an official translation.

Natural Language Processing (NLP) is a sub-discipline of the field of artificial intelligence and linguistics. In this field, how to process and apply a natural language is discussed; and natural language cognition refers to that a computer is made to "understand" the real meaning behind human languages.

A natural language generation system converts computer data to a natural language. A natural language understanding system converts a natural language to a form that can be more easily processed by computer programs.

In theory, the NLP is a very attractive way of human-computer interaction. Early language processing systems, such as SHRDLU, when using a limited vocabulary for making sessions within a limited "blocks world", can work quite well. This makes the researchers fairly optimistic on this system. However, when the systems are developed to be located in an environment filled with real-world ambiguity and uncertainty, they quickly lost confidence. Since the understanding of a natural language requires for the extensive knowledge about the outside world and the ability to use or manipulate the knowledge, the natural language cognition is also regarded as an AI-Complete problem.

The statistic-based NLP utilizes probabilistic and statistical methods to solve the problems existing in the NLP based on grammar rules. Especially for long sentences prone to be highly ambiguous, when practical grammar is applied for analysis, thousands of possibilities may be produced. The disambiguation methods adopted for processing these highly ambiguous sentences often utilize corpora and Markov models. The statistic-based NLP technology is mainly developed by evolution from the sub-fields, namely Machine Learning and Data Mining, associated with learning behavior in the artificial intelligence technology.

However, for the statistic-based NLP method, a corpus of paired language corpora containing a large amount of data needs to be established for the learning and use of a computer, and for the corpus of a large amount of data, retrieving of a corresponding result of machine translation (understanding) from the corpus and feeding back the result also require for the support of a large amount of computing resources. In addition, even if this method is adopted, great difficulties still exist in dealing with the diversity and uncertainty of the practical natural language.

The NLP technology has been widely used in practice. For example, it is used in an interactive voice response system, an internet call center system, and so on.

Interactive Voice Response (IVR) is a general term of telephone-based voice value-added services. Many institutions (such as banks, credit card centers, telecom operators, etc.) provide customers with a wide range of self-services through an Interactive Voice Response System (IVRS), in which a customer may dial a specified phone number to log into the system, and enter appropriate options or personal information according to the instruction of the system, so as to listen to the pre-recorded information, or combine data according to a preset program (Call Flow) through the computer system, and read out specific information (such as account balance, amount due, and so on) in the manner of speech, and may also input a transaction instruction through the system, so as to conduct a preset transaction (such as transfer, change of password, change of contact phone number, etc).

Despite the IVR system has been widely used over the past decade, but technically, the IVR system was born with a critical defect that is still troubling all institutions: an irreducible menu tree with multi-layer options. Most of the users, when using the IVR system to select the self-services, are impatient to take time to traverse a menu tree with multi-layer options, but directly turn to a manual customer service center by pressing "0", leading to an insurmountable gap between the expectation of the institutions on the ability of the IVR system to "effectively improve the rate of using self-services by the customers and substantially replace the manual operations" and the reality.

An Internet Call Center System (ICCS) is a new type of call center system booming in recent years, which adopts a popular Instant Messaging (IM) Internet technique, for enabling the mainly text-based real-time communication to be performed by the institutions and customers thereof over the Internet, and is applied to the customer services and remote sales of the institutions. The manual agent employing the ICCS can communicate simultaneously with two or more customers.

So to speak, the text-based ICC system is a variant of the speech-based IVR system. Both are necessary tools (either for customer services or for remote sales) for the communication between the institutions and the customers thereof, and both require for the high level of participation of the manual agent. Therefore, like the IVR system, it is also difficult for the ICC system to meet the requirement of "effectively improving the rate of using self-services by the customers and substantially replacing the manual operations" of the institutions.

On the other hand, the traditional speech-identification technology, based on the speech identification result being lack of accuracy and stability, employs keyword search technology, and uses an "exhaustive method" to perform semantic analysis on the speech. Although many companies majored in speech-identification technology spend a great deal of human efforts and money on two items of work, i.e., "transcription" and "keyword spotting", and persistently train a speech robot for a long time, but the actual effects are often far different from the ideal effects.

SUMMARY

According to one aspect of the present invention, a natural expression processing method is provided, which includes: identifying a natural expression from a user, to obtain a certain form of language information which can be processed by a computer; and converting the obtained language information to a standard expression in an encoded form.

In the natural expression processing method according to the embodiments of the present invention, optionally, the standard expression includes requirement codes embodying a user's requirements.

In the natural expression processing method according to the embodiments of the present invention, optionally, the requirement codes are expressed by digital codes.

In the natural expression processing method according to the embodiments of the present invention, optionally, the standard expressions further include requirement parameters further embodying the user's specific requirements.

In the natural expression processing method according to the embodiments of the present invention, optionally, the language information is constituted by language information units obtained through spotting and conversion performed on the natural expression in the form of speech by using a modeling tool.

In the natural expression processing method according to the embodiments of the present invention, optionally, the language information is constituted by one of phoneme, character, and phrase.

In the natural expression processing method according to the embodiments of the present invention, optionally, the conversion from the language information to the standard expression is implemented on the basis of an MT (Machine Translation) training dataset between the language information and the standard expression.

In the natural expression processing method according to the embodiments of the present invention, optionally, information associated with the natural expression is obtained during the identification of the natural expression, and the information is converted to a part of the standard expression.

According to another aspect of the present invention, a method for training a artificial intelligence robot is provided, which includes: establishing an MT training dataset, wherein the MT training dataset contains: computer-processable language information obtained by converting a natural expression, an encoded standard expression, and a corresponding relationship between the language information and the standard expression; and performing, by the artificial intelligence robot, an iterative comparison between various permutations and combinations of elements of the language information existing in the MT training dataset and various permutations and combinations of elements of the standard expression, to find out a corresponding relationship between the permutations and combinations of the elements of the language information and the permutations and combinations of the elements of the standard expression.

In the method for training an artificial intelligence robot according to the embodiments of the present invention, optionally, the data in the MT training dataset may be imported from an external database, and may also be generated or added through the manual aided understanding.

According to another aspect of the present invention, a natural expression processing method is provided, which includes: inputting a natural expression; identifying the natural expression, to obtain a certain form of language information which can be processed by a computer; determining whether the language information can be converted to an encoded standard expression through machine conversion; if determining that the desired standard expression cannot be obtained through the machine conversion, performing manual conversion processing; and outputting the standard expressions from the machine conversion or manual conversion.

In the natural expression processing method according to the embodiments of the present invention, optionally, the determining refers to determining whether the understanding of a robot is mature, wherein, the determining whether the understanding of the robot is mature is performed on the basis of evaluation on the accuracy rate of the understanding of the robot over a certain time interval.

According to still another aspect of the present invention, a natural expression processing and response method is provided, which includes: inputting a natural expression; identifying the natural expression, to obtain a certain form of language information which can be processed by a computer and relevant expression type information; determining whether the identified natural expression and the expression type information can be converted to an encoded standard expression through the machine conversion; if determining that the desired standard expression cannot be obtained through the machine conversion, performing manual conversion processing; invoking or generating a standard response matching with the standard expression obtained through the machine conversion and manual conversion; and outputting the generated standard response in the manner of corresponding to the expression type information.

In the natural expression processing and response method according to the embodiments of the present invention, optionally, the standard response is fixed data pre-stored in a database, or the standard response is generated on the basis of basic data of standard responses pre-stored in a database and variable parameters.

According to still another aspect of the present invention, a natural expression processing and response device is provided, which includes: a dialogue gateway, a central controller, an MAU workstation, a robot, an expression database, a response database, and a response generator, wherein, the dialogue gateway receives a natural expression from a user, transmits it to the central controller for subsequent processing, and transmits a response for the natural expression to the user; the central controller receives the natural expression from the dialogue gateway, and cooperates with the robot and the MAU workstation, to convert the natural expression to an encoded standard expression and instruct the response generator to generate a standard response corresponding to the standard expression according to the standard expression; the robot identifies the natural expression according to the instruction of the central controller, to obtain a certain form of language information which can be processed by a computer, and converts the language information to the standard expression using the expression database; the MAU workstation presents the identified natural expression or the natural expression from the user to an external MAU manual agent, the MAU manual agent inputs or selects the standard expression through the MAU workstation, and then the MAU workstation transmits the standard expression to the central controller; and the expression database is configured to store expression-related data, including: the language information data associated with the natural expression, the standard expression data associated with the standard expression, and the data associated with the relationship between the language information and the standard expression; the response database stores response-related data, including standard response data for invocation and/or data for generating a response; and the response generator receives the instruction of the central controller, and generates a response for the natural expression from the user by invoking and/or running the data in the response database.

In the natural expression processing and response device according to the embodiments of the present invention, optionally, the central controller updates the expression database and/or the response database.

In the natural expression processing and response device according to the embodiments of the present invention, optionally, the device further includes a trainer, configured to train the robot to convert the natural expression to the standard expression.

In the natural expression processing and response device according to the embodiments of the present invention, optionally, the dialogue gateway further includes an identity authenticator, configured to identify and verify a user's identity before receiving the natural expression information, wherein authentication methods for the user's identity at least include pass-phrase & voice-print identification.

According to still another aspect of the present invention, a natural expression processing and response system is provided, which includes: an intelligent response device and a calling device; wherein, a user communicates with the intelligent response device through the calling device, and a MAU manual agent operates the intelligent response device, wherein the intelligent response device includes: a dialogue gateway, a central controller, a MAU workstation, a robot, an expression database, a response database, and a response generator, wherein the dialogue gateway receives, from the calling device, a natural expression from the user, and transmits it to the central controller; the central controller instructs the robot to identify a certain form of language information which can be processed by a computer and related expression information from the natural expression, and then instructs the robot to convert the language information and the related expression information to a standard expression; if the understanding of the robot is not mature enough to complete the conversion to the standard expression, the central controller instructs the MAU workstation to prompt the MAU manual agent to perform a manual conversion to the standard expression, the MAU manual agent converts the language information and the related expression information identified by the robot to the standard expression, and inputs and transmits it to the central controller through the MAU workstation; the central controller instructs the response generator to invoke and/or run the data in the response database on the basis of the standard expression so as to generate a response for the natural expression from the user; and the dialogue gateway feeds back the response to the user through the calling device.

In the natural expression processing method according to the embodiments of the present invention, the natural expression may be converted to an encoded standard expression; because the conversion to the standard expression is converting the semantics of the natural expression to codes and parameters, and precise verbatim translation is not required, the requirement of accuracy for machine translation can be reduced, and meanwhile the complexity of the database for expression conversion (machine translation) is reduced, increasing data query and updating speed, and thus improving the performance of intelligent processing. In addition, the relatively simple encoded expression reduces the workload of manually-assisted interventions, increasing the efficiency of the work of manually-assisted interventions.

In the natural expression processing and response method, device, and system according to the embodiments of the present invention, the standard expression can be used to quickly point to the response, such that the customer no longer needs to spend a lot of time traversing the complicated routine menu of functions to find out the desired self-service. Moreover, a standardized natural expression-standard expression-standard response database can be established through the automatic learning, training, and manual aided understanding of the robot, so as to implement the automatic understanding and response of the system step by step. In addition, the database may also have the advantages including a small particle size, a narrow scope of knowledge, and a high data fidelity, so as to reduce the training difficulty of the robot, and shorten the maturation period of the robot's intelligence.

BRIEF DESCRIPTION OF THE DRAWINGS

In order to more clearly illustrate the technical solutions in the embodiments of the present invention, the accompanying drawings used in the embodiments will be described briefly hereinafter. Apparently, the drawings in the following descriptions merely illustrate the embodiments of the present invention, and are not intended to limit the present invention.

DETAILED DESCRIPTION

Figure 1:
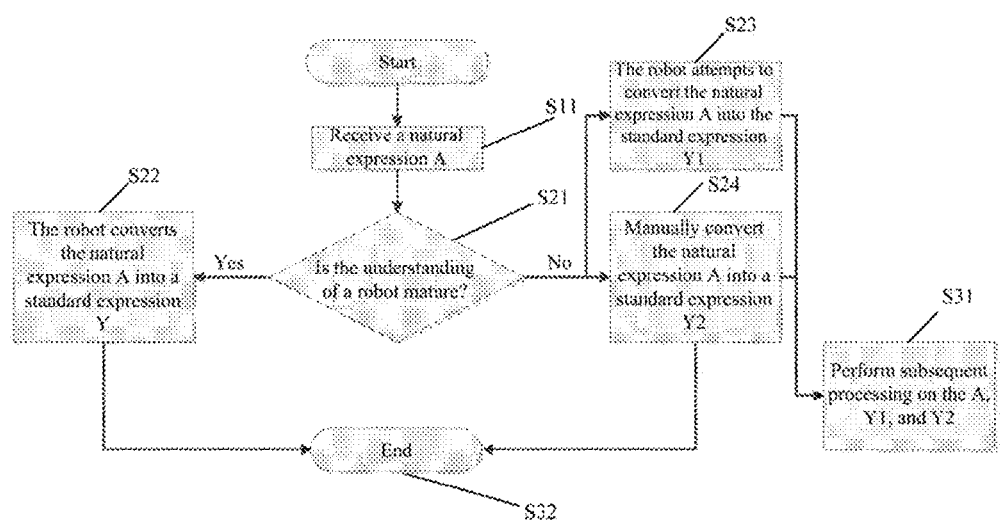
FIG. 1 schematically shows a flow diagram of a natural expression processing method according to an embodiment of the present invention.

To make the objectives, technical solutions, and advantages of the embodiments of the present invention more clear, the technical solutions of the embodiments of the present invention are described clearly and fully below with reference to the accompanying drawings of the embodiments of the present invention. Apparently, the described embodiments are merely a part of embodiments of the present invention, instead of all the embodiments. All other embodiments derived by a person of ordinary skill in the art based on the described embodiments of the present invention without creative efforts shall fall within the protection scope of the present invention.

Unless otherwise defined, the technical terms or scientific terms used herein shall have the general meanings that can be understood by a person of ordinary skill in the field of the present invention. The term "first" or "second" and other similar terms used in the description and claims of the present invention do not indicate any order, quantity, or importance, but are merely used to distinguish between the different components. Similarly, the term "a" or "an" and other similar terms do not indicate any quantitative restriction, but indicates that at least one is present.

The natural expression processing method according to the embodiments of the present invention can be applied in a customer service system such as the aforementioned Interactive Speech Response (IVR) or Internet call center system (ICCS) or other remote customer contact systems (such as a telephone sales system, a network sales system, and a VTM intelligent remote terminal). As stated above, in such applications, the requirement on the machine translation is not to make an exact word-by-word meaning, but to convert the natural expression of the customer into the information that can be understood by the system, thereby providing a response corresponding to the expression to the customer. In other words, the machine translation here focuses on the understanding on the real meaning of the human language, so as to express the actual intent or requirement of the customer "understood" from the natural expression in the form that can be more easily processed by computer programs.

In the natural expression processing method according to the embodiments of the present invention, the natural expression from the user is firstly identified or converted, to obtain a certain form of language information which can be processed by a computer, and then the obtained language information is converted to a standard expression in a certain form.

Irregular natural expression information presented in physical data from the user, such as an acoustic wave, can be referred to as "language information on the physical layer", and is also referred to as "A language information" below for short. Through a certain modeling tool, basic automatic identification or conversion is performed, to obtain language (hereafter referred to as "X language") information on the first logic layer presented in the form of permutations and combinations of several basic elements (hereafter referred to as "X element"). The standard expression in a certain form generated by converting the X language information obtained by identifying or converting the A language information is hereinafter referred to as "Y language information".

There are a variety of human natural expression methods. For example, the natural expression from the customer, namely the "A language information", may be divided into the following four categories: text information, speech information, image information, and animation information.

Among these, a text information expression may be as follows: the customer expresses himself by inputting text through a keyboard, for example, the customer enters "How much money is there in my saving account?" on a user interface of an Internet channel call center of one bank; an image information expression may be as follows: the customer expresses himself through an image, for example, the customer expresses the problem encountered by means of an image taken for error information during the use of a certain software through a computer desktop screen capture tool; a speech information expression may be as follows: the customer expresses himself through talking, for example, the customer talks with a customer service personnel of a service hotline (the telephone channel call center) of one bank, and asks during the talking over the phone: "What exactly do you mean? I'm not quite sure about that"; and an animation (also referred to as "video") information expression may be as follows: the customer shakes his head in front of a camera to express his disagreement.

As stated above, the natural expression (the A language information) of the customer is automatically identified and converted, to obtain information in a certain language form. If the A language information is the speech information, acoustic waveform information may for example be collected by means of a modeling tool and be automatically identified or converted to a certain type (corresponding to the speech information) of X language through a system (an intelligent robot); if the A language information is the graphic information, graphic pixel information may for example be collected by means of a modeling tool and be automatically identified or converted to an X language (corresponding to the image information) through a system (an intelligent robot); if the A language information is the animation information, graphic pixel information and image change speed information may for example be collected by means of a modeling tool and be automatically identified or converted to the X language (corresponding to the animation information) through a system (an intelligent robot); and if the A language information is the text information, no conversion needs to be performed.

Then, the aforementioned X language information obtained by the automatic conversion from the A language information or the text information for which no conversion is needed is "translated" into a regularized standard expression (Y language information) that can be "understood" by a computer or other processing devices. The Y language information can be automatically processed by a computer business system.

According to the embodiments of the present invention, regularized codes can be used to implement the regularized standard expression (the Y language information). For example, the following coding modes are adopted, including an industry code, an industry business code, an institution code, an institution business code, and an expression information code.

(1) Industry Code
Primary industry (2 letters, up to 26×26=676 primary industries)
Subordinate industry (3 letters, up to 26×26×26=17,576 subordinate industries per primary industry)

(2) Industry Business Code
Level-1 industry business category (1-digit number 0-9)
☐Level-2 industry business category (1-digit number 0-9)
☐Level-3 industry business category (1-digit number 0-9)
☐Level-4 industry business category (1-digit number 0-9)
☐Level-5 industry business category (1-digit number 0-9)
☐Level-6 industry business category (1-digit number 0-9)
☐Level-7 industry business category (1-digit number 0-9)
☐Level-8 industry business category (1-digit number 0-9)
☐Level-9 industry business category (1-digit number 0-9)
☐Level-10 industry business category (1-digit number 0-9)

(3) Institution Code (UID) (24-Digit Number=3-Digit Country Code+3-Digit City Number+18-Digit Institution Number)

(4) Institution Business Code
☐Level-1 institution business category (0-9)
☐Level-2 institution business category (0-9)
☐Level-3 institution business category (0-9)
☐Level-4 institution business category (0-9)
☐Level-5 institution business category (0-9)

(5) Expression Information Code
Information type code (2-digit number 1-99)
☐Language code (using an RFC3066 standard: http://tools.ietforg/html/rfc3066, e.g., zh-CN represents for "Simplified Chinese")
☐Dialect code (3-digit number 1-999)

Herein, the industry code represents the industries to which the subject that provides services belongs as pointed to by the irregular natural expression (A language information) from the customer. For example, it can be represented by 2 letters to cover 676 industries, and optionally, a subordinate industry code of 3 letters can be added to cover additional 17,576 subordinate industries per industry. In this way, the code may basically cover all the common industries; the industry business code represents for the service demand as pointed to by the A language information from the customer, and can also be represented by an Arabic numeral. For example, a 10-digit number is used for coding to cover a larger industry business category; the institution code represents the subject that provides services as pointed to by the A language information from the customer, and, for example, can mark the country and city where the institution is located. The institution business code represents for the internal personalized business division of the subject that provides services, for facilitating the personalized internal management of the institution. The expression information code represents identifying information of the A language information itself of the customer, which may include information type, language type, and the like, represented by numbers and letters.

The following shows two examples of the regularized standard expression (Y language information) according to the above coding manner:

Example 1: FSBNK271000000008601095588000000000000000000002zh-CN003
wherein,
the industry code is
FS=Financial Service (primary industry)
BNK=Bank (subordinate industry)
the industry business code is
2710000000=Level-1 industry business category—2 (credit card) ☐ Level-2 industry business category—7 (adjust the credit line) ☐ Level-3 industry business category—1 (raising the credit line) ☐ 0000000 (no more subdivision categories)
The institution code is
086010955880000000000000=Country code 086 (China) 010 (Beijing) 955880000000000000 (Head office of the Industrial and Commercial Bank of China)
The institution business code is
00000=no institution business category (in this Y language information, there is no institution business category self-defined by the institution "Head office of the Industrial and Commercial Bank of China", which means that: the Y language information belongs entirely to the industry business category, which is universal in the bank industry.)
The expression information code is
02=speech (the type of the A language information provided by the customer is "speech")
zh-CN=Mainland Chinese
003=Cantonese dialect In this example, the A language information corresponding to the Y language information may be, for example, "the credit line of my credit card is too low", "I want to raise my credit line", "I want to lower my credit line", "I need to adjust the credit line", and other speech information.

In some specific application circumstances, especially under the circumstance where the subject that provides services is determined, the above industry code, institution code, and institution business code can all be preset as default values of the system. In other words, the business code and the expression information code are obtained from the A language information provided by the customer only, and in this case, the Y language information can be represented as "271000000002zh-CN003"; alternatively, if a 3-digit number is sufficient for representing the industry business code for a specific application, the Y language information can be further represented as "27102zh-CN003"; further, if only for the speech service, it can be represented as "271zh-CN003"; if only the requirement expression of the customer is taken into consideration, and the type information of the expression itself is not cared, the Y language information can even be represented by "271" only. Example 2: TVTKT112000000000140477303 0500000000 0001240003fr-CH000

TV=Traveling Service (primary industry)
TKT=Ticketing (subordinate industry)
1120000000=Level-1 industry business category—1 (air ticket) □ Level-2 industry business category—1 (change the air ticket) □ Level-3 industry business category—2 (delay) □ 0000000 (no more subdivision categories)
001404773030500000000000=country code 001 (United States) □ 404 (Atlanta, Ga.) □ 773030500000000000 (Delta Airlines of the United States)
12400=Level-1 institution business category—1 (discount ticket) □ Level-2 institution business category—2 (off-season) □ Level-3 institution business category—4 (Asia-Pacific) □ 00 (no more subdivision categories)
03=image (the type of the A language information provided by the customer is "image", for example, when the customer performs an air ticket changing operation on the Delta official website, and encounters a system error reporting, the customer takes a screen shot as a natural expression for turning to the Delta customer service center for help.)
fr-CH=Switzerland French
000=No dialect In this example, the A language information corresponding to the Y language information is obtained through image identification. Likewise, under the circumstance where the subject that provides services is determined, the above industry code and the institution code can both be preset as default values of the system. In this case, the Y language information may be represented as "112000000001240003fr-CH000"; if only the requirement expression of the customer is taken into consideration, and the type information of the expression itself is not cared, the Y language information is represented by "112000000012400" only; and in the case where 3-digit number is applied specifically to represent the industry business code, and a 3-digit number is applied to represent the institution business code, the Y language information is represented by "112124" only.

The above are only examples of a regularized standard expression (the Y language information) according to the embodiments of the present invention, different code digits and code arrangement sequences may be used, and different code expressions or coding manners may also be used.

The natural expression (the A language information) from the customer always reflects the specific requirements of the customer. As stated above, the A language information of the customer is first automatically converted to the X language information or the language information for which no conversion needs to be performed (when the A language information is the text information), and then the X language information or the text language information is converted to a standard expression in an encoded form (the Y language information). In the above examples, the Y language information may include an industry code, an industry business code, an institution code, an institution business code, and an expression information code. Optionally, the A language information may also include specific parameters under the category that reflects the customer's requirements (which may be referred to as "requirement parameters"), for example: "Transfer 5000 yuan to a person" (Example 1), "I want to watch a movie, called Chinese Partners" (Example 2), and so on. A specific requirement code set (for example including one or more of the aforementioned industry code, industry business code, institution code, institution business code, and expression information code) corresponds to a specific parameter set. As in the above Example 2, if the requirement code of "watch a movie" is 123, the corresponding parameter set may also include a parameter: movie name. Then, the Y language information corresponding to the A language information is "123<Chinese Partners>". The 123 is the requirement code, and five characters in the <> are the requirement parameters. There are many manners for dividing the requirement codes and the requirement parameters in the Y language information, which may use a symbol such as "<>", may also be a blank space, or may be arranged in a specific sequence, or the like. The aforementioned process of converting the A language information of the customer into the information in a certain form of language that can be processed by the computer may be implemented through a speech signal processing technique, a speech identification technique, an image identification technique, and a video processing technique, and these techniques may be existing techniques. In fact, the concept of an encoded standard expression according to the embodiments of the present invention may also be applied in the identification processing of the natural expression.

Figure 6:
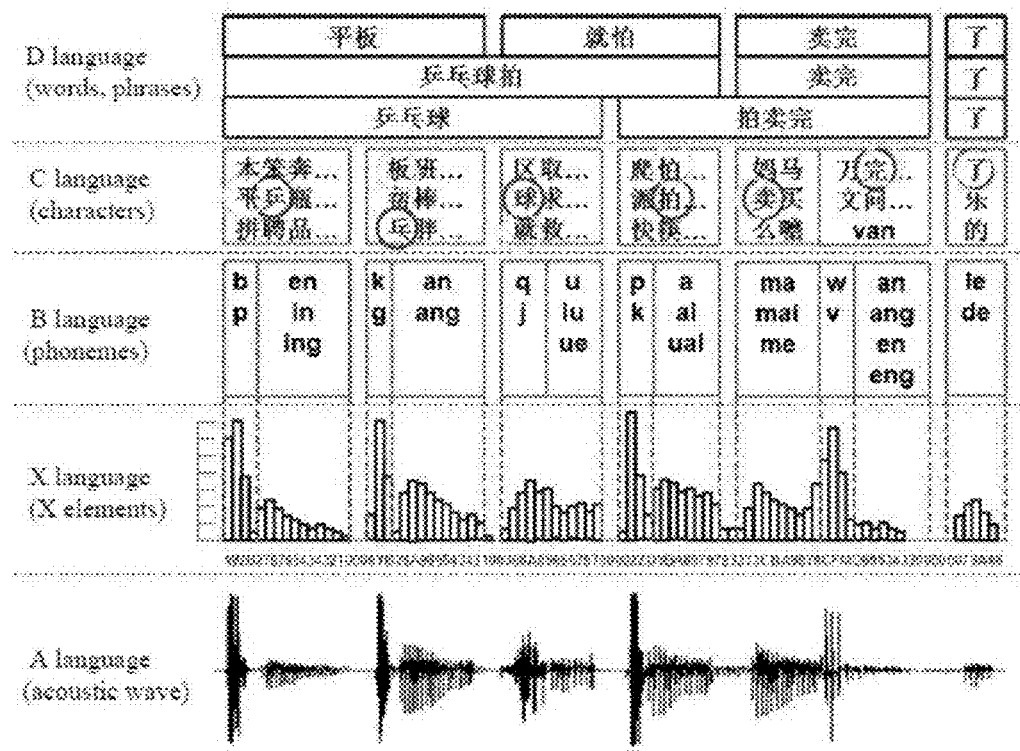
FIG. 6 shows an example of identification on speech information.

Hereinafter, the processing on the speech information is first taken as an example to introduce the identification processing of the natural expression, and to further illustrate the application of the technical concept of the present invention in the identification processing of the natural expression. FIG. 6 illustratively shows a process of processing the speech information. In the course of the processing, the processing from the A language to a D language is implemented. It should be noted that, the corresponding relationship between the "X language" information and the "A language" information, and the corresponding relationship between the "X language" information and the "B-language" information in FIG. 6 are only illustrated for demonstration.

The A language, namely an acoustic wave, is data on the physical layer collected by an acoustic wave collection device (e.g., a microphone).

Figures 7, 8:
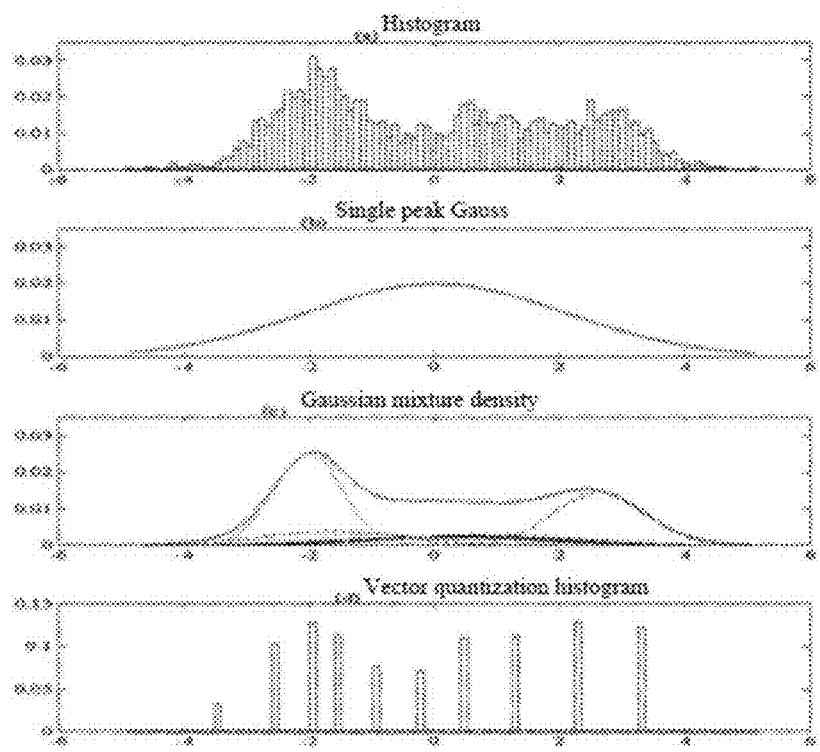
FIG. 7 shows an example of converting a collected acoustic wave to X elements by using a Gaussian mixture model.
FIG. 8 shows an example of conversion from a collected acoustic wave (A language information) to Y language information.

The X language is data on the first logic layer obtained after the speech signal processing on the A language data, which is referred to herein as the "X language". The X language is a language formed by various permutations and combinations of X elements. The X elements are several column elements having different heights formed by automatically spotting the acoustic wave through a certain modeling tool, such as a Gaussian Mixture Model (GMM). FIG. 7 shows an example of converting a collected acoustic wave (shown by a histogram) to the X elements (shown by a vector quantization histogram) by using a Gaussian mixture model.

Based on different modeling tools being applied to different natural speech sets, the number of the X elements can be controlled within a certain range (for example, below 200). According to the embodiments of the present invention, the combination of 2-digit ASCII characters is defined an ID of the X elements, as shown in FIG. 8. In other words, the number of the X elements can be up to a maximum of 16,384 (128×128=16,384), which can meet the requirement for increasing the number of the X elements due to further development of the acoustic wave modeling technique in the future. After the spotting, acoustic wave units are one-to-one corresponding to the X elements. Because the A language information can be considered as a combination of the acoustic wave units, and the X language information is a combination of X elements, the conversion (or referred to as "identification") relationship from the A language to the X language in FIG. 6 is a "many-to-many" relationship. FIG. 6 shows an example of the X elements represented by ASCII characters.

The "B language" is a language formed by various permutations and combinations of B elements, and is data on the second logic layer in FIG. 6. All or part of permutations and combinations of the X elements form the B elements, so it can also be understood as that the X language is converted to B elements, and the B elements constitute the B language. Thus, the conversion relationship from the X language to the B language is a "many-to-many" relationship. The B elements may be phonemes, and some permutations and combinations of the B elements constitute syllables. The "phoneme" and "syllable" herein have the same meanings as in the category of linguistics. FIG. 6 shows examples of the B elements, and these examples are phonemes of Chinese (Mandarin).

The "C language" is a language formed by various permutations and combinations of C elements, and is data on the third logic layer in FIG. 6. All or part of permutations and combinations of the B elements form the C elements, so it can also be understood as that the B language is converted to C elements, and the C elements constitute the C language. Thus, the conversion relationship from the B language to the C language is a "many-to-many" relationship. If a linguistics system of phonemes and syllables is further used, the C elements correspond to the "characters" in the natural language. FIG. 6 shows examples of the C elements, and these examples are characters in Chinese.

The "D language" is a language formed by various permutations and combinations of D elements, and is data on the fourth logic layer in FIG. 6. All or part of permutations and combinations of the C elements form the D elements, so it can also be understood as that the C language is converted to D elements, and the D elements constitute the D language. Thus, the conversion relationship from the C language to the D language is a "many-to-many" relationship. If the linguistics system of phonemes and syllables is used, the D elements correspond to the "words" or "phrases" in the natural language. FIG. 6 shows examples of the D elements, and these examples are words in Chinese.

The example of the "C language" and the example of the "D language" in FIG. 6 seem to have the same content, which both are composed of "我", "的", "信", "用", "卡", "丢", "了" in sequence, but those familiar with Chinese can know that, the understanding given only according to the C language may produce great ambiguity, but the expression, after being converted to the "D language", can have a definite meaning. For other languages, conversions on the characters→words or phrases are also very important for semantics understanding, particularly in the case where the speech identification is implemented by an intelligent system (a speech robot). According to different natural languages, the "characters" and "words", i.e., the C language information and the D language information, may also be classified as the same level of language information.

The "Y language" is data on the fifth logic layer (as shown in FIG. 8), which refers to the language information embodying "meaning" or "meanings" obtained after the understanding of the original natural language information A. The "standard expression" defined above in the present invention is a form of the "Y language". According to the embodiments of the present invention, for example, the bank industry may use a business code "21" to represent the meaning of "reporting the loss of a credit card"; use a business code "252" to represent the meaning of "partial repayment of a credit card", and "252-5000" (the requirement code=252, and the requirement parameter=5000) to represent the meaning of "repayment of 5000 Yuan for a credit card"; the entertainment industry may use a code "24" to represent the meaning of "watch a movie", and "24-Chinese Partners" (the requirement code=24, and the requirement parameter="Chinese Partners") to represent the meaning of "watch a movie called Chinese Partners". Thus, the conversion relationship from the D language to the Y language is also a "many-to-many" relationship.

Figure 9:
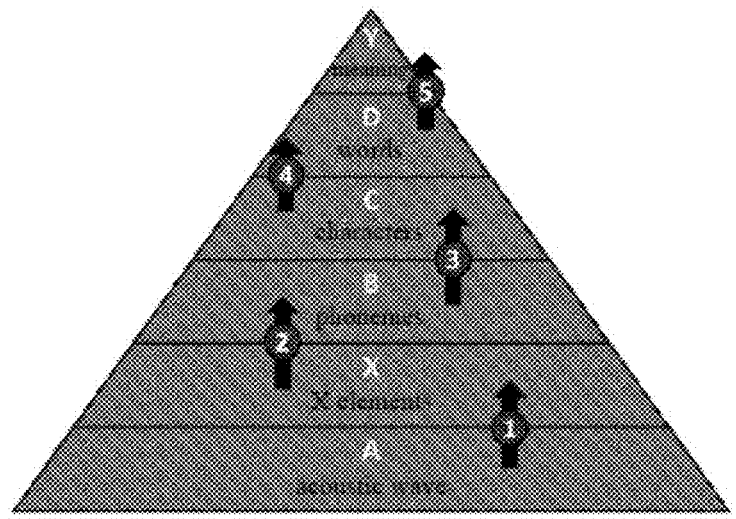
FIG. 9 generally shows layer-by-layer conversion from a collected acoustic wave (A language information) to Y language information.

FIG. 9 schematically shows a process of converting from the collected acoustic wave (the A language information) to the Y language information layer by layer. It can be seen from FIG. 9 that, five times of conversion (translation) are performed on six types of language information, from the "acoustic wave" (the A language information) to the "X elements" (the X language information), then to the "phonemes" (the B language information), then to the "characters" (the C language information), then to the "words" (the D language information), and finally to the "meaning" or "meanings" (the Y language information). From the perspective of the data structure of the database, it starts from the "acoustic wave" as the initial language information A, and selects the paths of the permutations and combinations of five language constituting elements, to find out or correspond to the sixth type of language information data, namely the target language information Y.

Because the aforementioned five times of language information conversion need to be performed, the robot is also required to have the ability to achieve the five types of information language conversion. In general, the five-step conversion can be divided into three stages. In the three stages, in order to train the speech robot, the manual aided identification is always required.

The first stage: from the A language information (acoustic wave) to the C language information (characters). The two-step conversion from the A language information (acoustic wave) to the B language information (phonemes), with the help of the information extraction and conversion algorithms (such as the aforementioned Gaussian mixture model) of the language information X, generally can be done automatically by the robot more accurately. However, in the conversion from the B language information (phonemes) to the C language information (characters), a higher error rate may occur. For example, in Chinese, as shown in the example of FIG. 6, the original language information input by the customer is "乒乓球拍卖完了 (The table tennis racket is sold out)", but probably because of the customer's pronunciation or accent problems, the "乒乓球" may be identified as a "平板就", and "拍" may be identified as "怕"; as a result, this acoustic wave is eventually converted to seven characters, namely "平板就怕卖完了". In order to improve the identification accuracy of the robot, especially with respect to the problems such as the aforementioned pronunciation or accent, the identification result of the robot needs to be corrected, usually by means of the manual aided identification. The manual aided identification at this stage is referred to as transcription. The so-called transcription refers to that, the transcription personnel, by the use of specific tools, performs accurate spotting on the "acoustic wave" (the A language information), and converts the wave bands obtained by spotting to the corresponding "characters" (the C language information), thereby defining a conversion/translation relationship between the A language (acoustic wave) and the C language (characters) for the robot. The precision of the spotting mainly depends on the carefulness of the transcription personnel and the familiarity for the transcription tools; and whether it can be converted to corresponding "characters" accurately depends on whether the transcription personnel has accurately understood the language environment in which this acoustic wave is located and the context (other acoustic waves before and after this acoustic wave). Particularly for the Chinese characters, there are many characters having the same pronunciation, which increases the difficulty in accurate operation for the transcription personnel.

The second stage: from the C language information (characters) to the D language information (words, phrases). Conversion from characters to words is also open to different interpretations, as in the preceding example, even if the identification from the acoustic wave to the characters is accurate, and a result of sever characters "乒乓球拍卖完了" arranged in sequence is obtained, at least two conversion results may be generated, namely "乒乓球拍+卖+完了" and "乒乓球+拍卖+完了", which have obviously different meanings. Likewise, the manual aided identification may be adopted to make rectification. The manual aided identification at this stage is referred to as keyword spotting, and may also be referred to as "word spotting" for short; that is, the word spotting personnel combines the "characters" (the C language information) obtained through transcription, to form "words (keywords)" (the D language information), thereby defining a conversion/translation relationship between the C language (characters) and the D language (words) for the robot. Whether the word spotting is accurate often depends on the mastering degree of the word spotting personnel on the business knowledge. With respect to different fields, the personnel familiar with the business content and terminology in this field is needed to perform the word spotting operation, and the cost thereof is also higher than that of the transcription.

The third stage: from the D language information to the Y language information, i.e., the understanding of meanings. If merely a certain words arranged in sequence are obtained, a true meaning of the customer often still cannot be accurately understood. For example, the customer says "我的信用卡不见了 (My credit card is lost)", the robot cannot identify the meaning thereof, and the technician inputs "我的", "信用卡", and "不见了" into a syntax table of the database as new keywords; and another customer says: "俺的刷刷卡丢了", the robot cannot identify the meaning thereof again, and the technician inputs "俺的", "刷刷卡" (which means the "信用卡"), and "丢了" into the syntax table of the database as new keywords. In this way, by means of the manual aid, the meanings or requirements of the customer are understood, and incorporated into the database. This manual aided identification is referred to as keyword pile-up, or "word pile-up" for short, namely, the permutations and combinations of "words" are accumulated, and incorporated into the database in accordance with the meaning thereof. The workload of such a task is huge, and the expertise of the training personnel is also required to aid the understanding.

As stated above, in the natural expression processing method according to the embodiments of the present invention, the natural expression of the customer (the A language information) is first automatically converted to obtain the X language information, or no conversion is needed to directly obtain the C language information (when the A language information is the text information); and then the X language information or the C language information is converted to the Y language information. With reference to the preceding analysis, the irregular natural expression may be one of the X language information, the B language information, the C language information, and the D language information. In other words, the process of the natural expression processing may be: one of A→X→Y, A→B→Y, A→C→Y, and A→D→Y.

Figure 10:
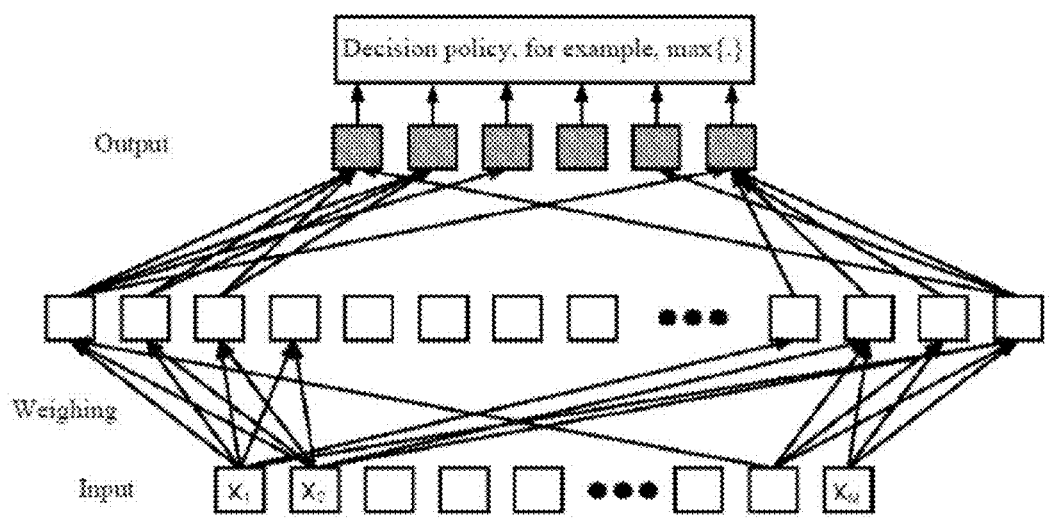
FIG. 10 is a schematic view of the principle of multi-layer perception.

If, in accordance with the language information converting model shown in FIG. 9, a multiple-layer "many-to-many" relationship conversion on the aforementioned six types of languages A→X→B→C→D→Y needs to be performed, it is academically referred to as Multi-Layer Perception (MLP), as shown in FIG. 10. The disadvantage of the multiple-layer "many-to-many" relationship conversion is that: each time of conversion will cause distortion of the original information to a certain extent, and will add more processing load to the system, resulting in a further loss in performance. More times of conversion cause more serious distortion of the original information, so that the processing speed of the system is slower. Similarly, because the intervention of the manual aid is required in the robot training at all the aforementioned three stages, a very high workload and costs will be produced on the one hand, and on the other hand, many times of human intervention will also increase the probability of error. Therefore, if the conversion of A→X→Y can be implemented and the multiple-layer "many-to-many" conversion of X→B→C→D→Y is omitted, the accuracy and efficiency of the expression information conversion can be improved, and the workload and the error rate of the manual aided identification can also be reduced.

According to the technique of the present invention, firstly, the irregular natural expression information such as text, speech, image, or video is converted to the X language information through a modeling tool; then with the X language as the language on the left side and the Y language as the language on the right side, the conversion from the X language information to the Y language information is implemented through the use of the machine translation (MT) technique.

Specifically, for example in the processing of the irregular natural expression information such as speech, the "speech signal processing" technique is firstly utilized to automatically convert/translate into the X language (based on the current "speech signal processing" technique, the accuracy rate of A→X conversion can generally reach above 95%, and the improved "speech signal processing" technique works better in noise reduction, and can increase the accuracy rate of the A→X conversion to above 99%); and then the machine translation technique can be used to implement the X→Y automatic machine translation, without the need of the multiple-layer conversion of X→B→C→D→Y.

A machine translation algorithm similar to the statistical analysis on instance samples can be used to convert the irregular natural expression (the X language information) obtained through conversion to the regularized standard expression (the Y language information). This machine translation algorithm requires for sufficient amount and sufficient accuracy of corresponding data between the X language and the Y language.

In the method according to the present invention, in consideration that the accurate automatic machine conversion of A→X can be implemented, in order to accumulate the corresponding data between the X language and the Y language, the corresponding data between the A language and the Y language is accumulated. Thus, the solution of the present invention provides a new working mode of a manual agent, namely manual aided understanding (MAU), which implements accumulation of the corresponding data between the A language and the Y language by means of manual understanding in combination with code input. As in the preceding example, the requirement code "271" may be used to express the meaning of adjusting the credit line of the credit card, and similarly, "21" may also be used to express the meaning of reporting a loss of the credit card, and thus "21" may be used to correspond to the aforementioned natural expression information "我的信用卡不见了" or "俺的刷刷卡丢了". Such a simple code inputting manner, the traditional "agents with talking" is turned into "agents without talking", such that the work of the agents becomes more comfortable, the understanding capability of the highest values of humankind is more fully utilized while the working efficiency is greatly improved, and a tremendous amount of the corresponding data between the A/X language and the Y language is rapidly and accurately collected; the data is provided to an MT engine for cyclic iteration, self-learning the A/X→Y conversion/translation rule, and forming an A/X→Y translation model.

Introduced below are the principles of a machine translation technique and a machine translation robot training technique according to the present invention.

The machine translation is an artificial intelligence technique for automatically translating two languages. The "language" mentioned herein is not a narrowly defined national language (for example: Chinese, English . . . ), but is a generalized information representation mode. As mentioned above, in respect of the representation mode, the language can be divided into four major categories: text, speech, image, animation (also referred to as "video").

The language is the information formed by various permutations and combinations of the elements in an element set. For example: the English text is a language formed by 128 ASCII characters (the elements) in an ASCII character set (the element set) through various one-dimension (serial) permutations and combinations; the Chinese language is formed through infinite permutations and combinations of a thousand of characters in combination with punctuations in the international codes (the basic elements constituting the Chinese information); and for another example, an RGB planar image is another language formed by three sub-pixels including red, green, and blue through various two-dimensional (in length and width) permutations and combinations.

If a certain conversion/translation rule exists between any two languages, the automatic conversion/translation rule between the two languages can be found through analysis on the corresponding relationship between the permutations and combinations of the two language elements. It is firstly required to manually collect the corresponding data (or "translation samples") of the two languages, then to find out the automatic conversion/translation rule between the two languages through the cyclic iteration of the permutations and combinations of the two language elements, so as to form a translation model of the two languages.

Two datasets are required for making the machine translation: a "training dataset" and a "testing dataset".

The two datasets have a similar data structure: pairs of data are stored, in which the left value is a "left language" (or referred to as the "source language"), and the right value is a "right language" (or referred to as the "target language"). An analogy can be made vividly: the "training dataset" is a self-learning book given by the humankind to the MT robot, and the "testing dataset" is a test question given by the humankind to the MT robot, for evaluating the self-learning effect of the robot.

The following is an example of the "training dataset" and the "testing dataset" for the English→Chinese MT:

| | English | Chinese |
|---|---|---|
| | Training dataset | |
| 1 | How old are you? | 您多大了？ |
| 2 | What's your age? | 你年纪多大了？ |
| 3 | May I have your time? | 请问您现在什么时间了？ |
| 4 | May I have your name? | 请问您的名字？ |
| 5 | Sorry, your age is not qualified. | 对不起，您的年纪不符合要求？ |
| | . . . | . . . |
| | Testing dataset | |
| 1 | May I have your age? | 请问您年纪？ |
| | . . . | . . . |

The MT robot performs the cyclic iteration on the permutations and combinations by taking the elements constituting the language as units. As in the above example, it is found through the two data pairs #3 and #4 in the training dataset that, the permutations and combinations of 15 ASCII character elements (3 English letters "May"+1 space+1 English letters "I"+1 space+4 English letters "have"+1 space+4 English letters "your") of English "May I have your" are corresponding to the permutations and combinations of 3 Chinese characters "请问您" of GB codes; and it is found through the two data pairs #2 and #5 in the training dataset that, the permutations and combinations of 3 ASCII character elements of English "age" are corresponding to the permutations and combinations of 2 Chinese characters "年纪" of GB codes.

Therefore, if the robot can translate the English "May I have your age?" in the testing dataset into the Chinese "请问您年纪?" accurately, it proves that the robot has learned this English-Chinese translation of this sentence; and otherwise, it proves that the robot has not learned it. Then the robot needs to make a revision on his own learning method (for example, to find another path to try learning again), for which the training dataset is digested again, and this is another iteration; . . . if this "iterative amendment" is constantly repeated, the translation accuracy rate of the robot keeps climbing. When the translation accuracy rate climbs to a certain degree (for example, the translation accuracy rate is 70%), the translation accuracy rate of the robot may keep hovering around this level, and is difficult to go up; that is to say, it encounters the "self-learning of the robot" bottleneck, and then, the data in the MT training dataset needs to be increased for the robot. The data in the MT training dataset may be imported from an external database, and may also be generated or added through the "manual aided understanding".

For example, in the previous example of the credit card business, when it is assumed that the irregular natural expression obtained is "我的信用卡能透支的太少了 (the overdraft limit of my credit card is too low)", and when the understanding of the robot is not sufficiently mature, the "manual aided understanding" can intervene, such that the expression can be understood as "我想增加我的信用卡额度(I want to raise the credit line of the credit card)" manually, and the corresponding Y language information is input. Optionally, during the "manual aided understanding" processing, the understanding process and understanding result on the natural expression need not to be recorded, and only the corresponding standard expression (the Y language information) as the final processing result is recorded. In this way, the manual operation is simplified, and resources are saved. For example, the operator only needs to input "271" as the standard expression to complete the processing on the irregular natural expression "我的信用卡能 透支的太少了 (the overdraft limit of my credit card is too low)". For example, the new natural expression instance, such as the aforementioned natural expression "我的信用卡 能透支的太少了 (the overdraft limit of my credit card is too low)", and the corresponding standard expression "271" are added to the existing MT training dataset, thereby increasing and updating the data in the MT training dataset. Thus, through the "manual aided understanding", an accurate and stable conversion on the target natural expression (converted to a standard expression, namely the Y language information) can be achieved on one hand, and efficient adding and updating of data in the MT training dataset can be achieved on the other hand, such that the data in the MT training dataset of the system becomes richer and more accurate, and the accuracy rate of the translation (conversion) of the robot may also be efficiently improved.

In theory, the MT robot needs to exhaustively list all the permutations and combinations of the 20 ASCII character elements of the #3 left-value "May I have your time", and also needs to exhaustively list all the permutations and combinations of the 10 GB code Chinese characters of the #3 right-value "请问您现在什么时间了". That is, the MT robot needs to exhaustively list all the permutations and combinations of the left and right groups of elements of each pair of data in the training dataset. Through the exhaustive listing at element level, the MT robot must be able to find a lot of repeated permutations and combinations (such as "your", "May I have your", "age", "time", "您", "请问您", "年纪" . . . ), so as to find a certain corresponding relationship between the permutations and combinations of the left language elements and the permutations and combinations of the right language elements which appear repeatedly, i.e., the translation model between two languages. In other words, a larger amount of the left and right language data pairs in the training dataset brings out a larger number of permutations and combinations of the left and right language elements appearing repeatedly as found by the MT robot, a larger number of corresponding relationships of the permutations and combinations of the left and right elements appearing repeatedly, and thus a larger number of conversion/translation rules of the left and right languages mastered by the MT robot, thereby providing a more mature translation model. Therefore, with the "regularized standard expression" and "manual aided understanding" according to the technical concept of the present invention, the data of the MT training dataset can be more efficiently accumulated, thus helping to achieve the self-learning and automatic machine translation of the robot.

In the present invention, the machine translation between the X language→Y language has the same principle as that of the machine translation between Chinese and English, except that the English is changed into the X language and the Chinese is changed into the Y language, and accordingly the element sets of the left and right languages are different.

As stated above, the machine translation technique can be used to automatically translate one language into another language. The technical principle thereof is to make analysis at the basic element level on the collected pairing information of two languages (a language on the left side and a language on the right side), by performing an iterative comparison on various permutations and combinations of the basis elements of a large number of language information pairs, to find out the conversion/translation rule between the two languages, thereby forming a translation model of the two languages.

The present invention extends the application scope of the machine translation technique from automatic translation between different national languages to automatic conversion from all the irregular multimedia natural expression information (text, speech, image, or video, namely the A language information) to the regular standard information (the Y language information), such that they can be processed by business systems of various sectors, so as to realize practical natural language processing (NLP) in the true sense.

Because multi-layer linguistic analysis needed for the traditional machine translation is not required, with the analysis of the instances at the basic element level, the accuracy and speed of translation can be increased, and updating and expansion can also be easily achieved by adding the natural expression instances and the standard expression.

With respect to the natural expression processing according to the embodiments of the present invention, because only the conversion from the natural expression (the A language information) to the standard expression (the Y speech information) is needed, in other words, it is only required to establish an A/X→Y translation model, without the need of processing a translation result of the text language, the modification processing needs not to be performed on the translation result.

In addition, the natural expression processing according to the embodiments of the present invention can be limited to the use in specific business of specific sectors and institutions, for example, in the above credit card business, such that the scale of the MT training dataset required by the processing system can be greatly reduced. Thus, the maturation threshold of the understanding of the robot is increased, the costs for constructing and maintaining the MT training dataset are reduced, and the maturation period of the A/X→Y translation model is effectively shortened.

As previously stated, the natural expression processing system according to the embodiments of the present invention achieves the conversion from a natural expression to an encoded standard expression. The conversion is based on the MT training dataset storing the pairing data of the A/X language and the Y language information, and the A/X→Y translation model obtained on the basis of the MT training dataset. Therefore, it is required to collect a certain amount of accurate A/X language data and Y language data to generate the MT training dataset, and to form A/X→Y translation model through the self-learning (self-training) of the robot (the information processing system). The formation of the MT training dataset may be conducted through the manual aided understanding.

FIG. 1 schematically shows a flow diagram of a natural expression processing method according to one embodiment of the present invention.

In step S11, a system receives natural expression information (A language information), and as previously stated, the natural expression information may be text information, speech information, image information, video information, and so on.

In step S21, whether the understanding of a robot is mature is determined. Herein, the basis of the determining whether the understanding of the robot is mature is that, within a certain time interval (set according to specific application requirements), a result Y1 obtained through converting, by the robot, the A language information to the X language information and then converting the X language information to the Y language information, is compared with a result Y2 obtained through directly manually converting the A language information to the Y language information, and the number of times when Y1 and Y2 are the same as each other is divided by the total number of times to obtain a percentage, which is an accuracy rate of the understanding of the robot. The accuracy rate of the understanding of the robot set according to the application requirements is referred to as "a maturation threshold of the understanding of the robot". If the accuracy rate of the understanding of the robot is lower than the maturation threshold of the understanding of the robot, the system considers that the understanding of the robot is not yet mature, and the manual conversion result Y2 is further adopted instead of the robot conversion result Y1, in order to ensure accuracy and stability of the understanding of the system on the A language information. At the same time, the system adds the X language information (language on the left side) obtained through automatic machine conversion performed on the A language information machine, and the manual conversion result Y2 (language on the right side) into the MT training dataset, for use in the self-training of the MT robot.

If the understanding of the robot is mature, in step S22, the robot automatically converts the natural expression A to the standard expression Y directly; and if the understanding of the robot is not mature, in step S23, the robot attempts to convert the natural expression A to the standard expression Y1, and at the same time, in step S24, the MAU agent converts the natural expression A to the standard expression Y2.

In step S32, if it is determined in step S21 that the understanding ability of the robot has already been mature, the result Y of the automatic conversion of the robot is output; and otherwise, the result Y2 of the manual conversion of the MAU agent is output.

Optionally, in step S31, the subsequent processing is performed on the natural expression A, the result Y1 of the conversion attempted by the robot, and the result Y2 of the manual conversion of the MAU agent by placing the X language information (the language on the left side) automatically converted from A together with Y2 (the language on the right side) into the MT training dataset as a pair of new pairing data; and comparing Y1 with Y2, to serve as the statistic data for "determining whether the understanding of the robot is mature". Optionally, the original data A is retained, and when the A→X conversion technique is further developed to be mature (have a higher conversion accuracy rate) in the future, the data of the language on the left side of the MT training dataset is updated.

Figure 2:
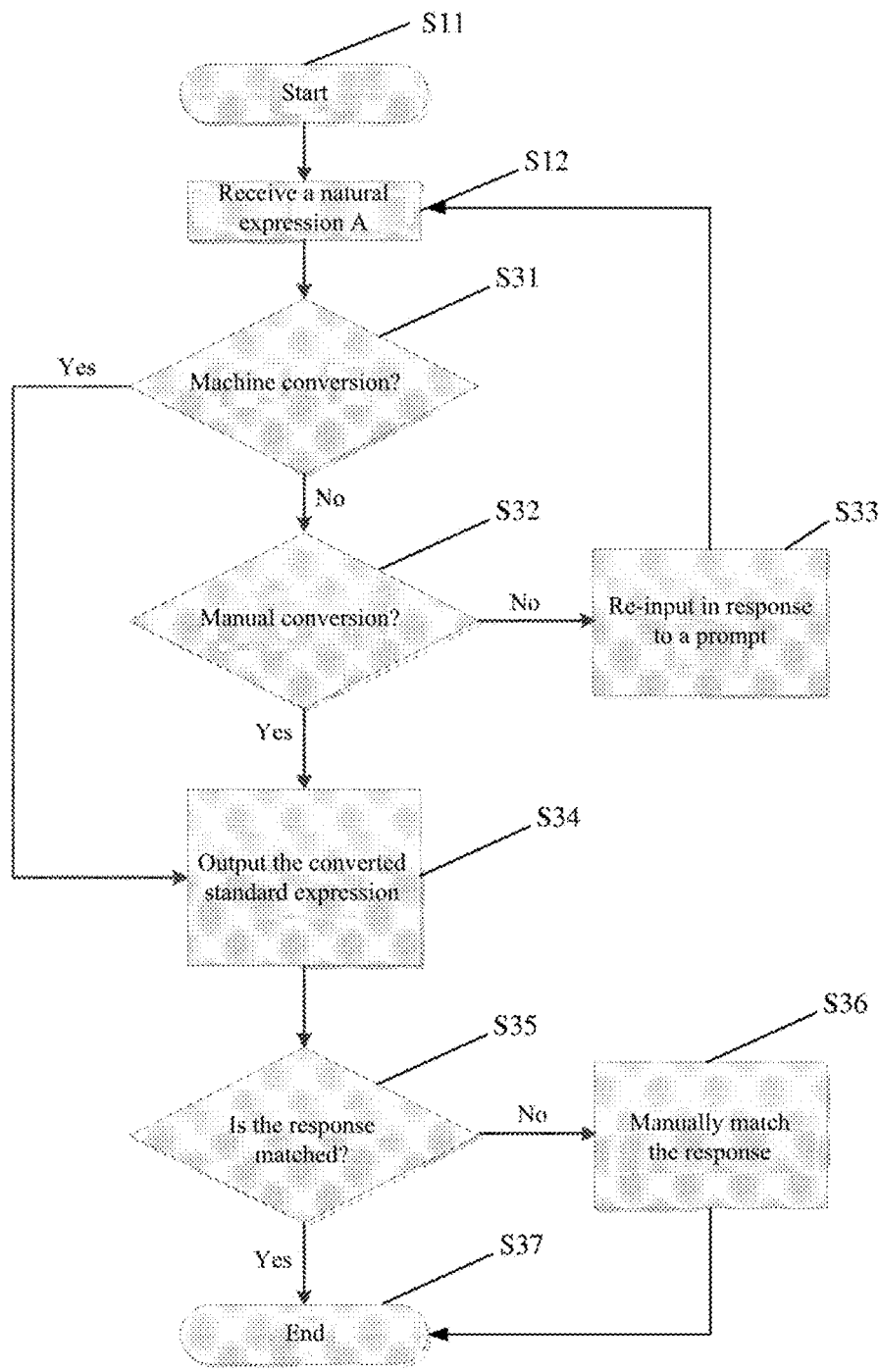
FIG. 2 schematically shows a flow diagram of a natural expression processing and response method according to an embodiment of the present invention.

FIG. 2 schematically shows a flow diagram of a natural expression processing and response method according to one embodiment of the present invention.

In the processing shown in FIG. 2, as in FIG. 1, a natural expression A is firstly received in step S12. Then, whether the natural expression A can be converted to a standard expression Y through machine conversion is determined in step S31. This step is equivalent to step S21 in FIG. 1.

Similar to the processing in FIG. 1, when it is determined in step S31 that the desired standard expression cannot be obtained through the machine conversion, manual conversion processing is performed in step S32.

In practical applications, there may exist cases where the identified natural expression or the requirement expressed by the customer cannot be understood even through the human processing, and at this time, a response for prompting the customer to re-input is made in step S33 and then the processing returns to step S12, where a natural expression information A re-input by the customer is received. The "response for prompting the customer to re-input" may be, for example, speech prompts "excuse me, could you please say what you need again", "could you speak slowly"; text prompts "excuse me, please write more specifically"; or image prompts.

In Step S34, the standard expression of the machine conversion or the manual conversion is output. In Step S35, a standard response matching the standard expression is queried. The standard response may be fixed data pre-stored in the database; alternatively, basic data of the standard response is pre-stored in the database, and then by the system, the basic data is synthesized with the variable parameters of the individual case to generate the standard response. In one embodiment, a standard response ID is set as a primary key of the response data, and a corresponding relationship table between the requirement codes of the standard expression (the Y language information) and the standard response ID is set in the database, such that the requirement codes of the standard expression (the Y language information) are associated with the response data. Table 1-Table 3 below schematically show examples of the expression data table, the expression response relationship table, and the response data table, respectively. Optionally, the standard expression and the standard response ID are in a many-to-one relationship, as shown in Table 4. In addition, in other embodiments, because the requirement codes of the standard expression (the Y language information) are encoded themselves, the requirement codes of the standard expression (the Y language information) may also be directly used as the primary key of the response data.

TABLE 1

Expression Data Table

| Natural expression | Type | Standard expression |
|---|---|---|
| Received | Speech | [expression 1] |
| Transfer 5000 yuan to my Mom | Text | [expression 2] |
| <Transfer failure page screenshot> | Image | [expression 3] |
| 2-5-1000 | Telephone key | [expression 4] |
| . . . | . . . | . . . |

TABLE 2

Expression Response Corresponding Table 1

| Requirement codes of standard expression | Standard response ID |
|---|---|
| [expression 1] | [response 3] |
| [expression 2] | [response 1] |
| [expression 3] | [response 4] |
| [expression 4] | [response 2] |
| . . . | . . . |

TABLE 3

Response Data Table

| Standard response ID | Type | Response content |
|---|---|---|
| [response 1] | Program | <Transfers 5000 yuan to MS X> |
| [response 2] | Program | <Repayment of 1000 yuan to the credit card> |
| [response 3] | Speech | OK, I know, thanks! |
| [response 4] | Video | <Simple tutorial to error correction in transfer> |
| ... | ... | ... |

TABLE 4

Expression Response Corresponding Table 2

| Standard response ID | Standard expression |
|---|---|
| [response 80] | [expression 74] |
| [response 80] | [expression 12] |
| [response 80] | [expression 23] |
| [response 81] | [expression 31] |
| [response 81] | [expression 57] |
| ... | ... |

As previously stated, the standard expression may include natural expression-related information, for example, expression type, language type, dialect type, and so on. For example, the natural expression from the customer is the speech "received", the standard response obtained by querying the converted standard expression is the speech "OK, I know, thanks!" For another example, the natural expression from the customer is the image "Transfer failure page screenshot", the standard response obtained by querying the converted standard expression is the video "Simple tutorial to error correction in transfer".

If the standard response matching the standard expression does not exist in the database, the corresponding response can be matched manually in step S36. The manual matching can associate the standard expression with the standard response ID by inputting or selecting the standard response ID, or associate the standard expression with the response data directly, and may also establish new response data. The reason why the standard response is not found is probably that the standard expression is newly added manually, or is probably that the same type of the standard response is not matched. Then, the response of the machine matching or manual matching is output in step S37. The content of the response is invoked or generated according to different information types. For example, for the speech response, the playback of live recording may be conducted or the speech on which TTS (Text To Speech speech synthesis) has been performed is output; for a user's digital operation, such as a telephone key sequential combination "2-5-1000", the operation "Repayment of 1000 yuan to the credit card" is completed by running a program.

For the text information such as "Transfers 5000 yuan to my Mom", the operation "Transfers 5000 yuan to MS X" is performed by running a program, but the system may not master the account information "MS X" in advance, and thus, on the one hand, the account information may be manually added to achieve the conversion to the standard expression, and on the other hand, even if the conversion to the standard expression is implemented, the corresponding standard response may not be queried, and the response processing needs to be manually performed. At this time, new response data (such as an operational procedure) will be generated, a new standard response ID may also be manually or automatically assigned to the response data, and the standard response ID is associated with the above converted standard expression. Thus, while the response for the natural expression of the customer is achieved, manual aided understanding and training can be achieved, and an expression-response database is updated.

In the natural expression processing and response method according to the embodiments of the present invention, the standard expression can be used to quickly point to the response, such that the customer no longer needs to spend a lot of time traversing the complicated routine menu of functions to find out the desired self-service.

On the other hand, different from the conventional response mode, the manual operation is mainly limited to the "decision" at the background, which includes determining the requirement codes of the standard expression (the Y language information), and selecting a response (or the response ID) or generating a response operation, without the need of direct communication with the customer at the foreground by phone or by means of text input (other than inputting the requirement parameters of the standard expression (the Y language information)). Thus, a large amount of human efforts can be saved, and the working efficiency can be greatly increased. In addition, as compared with the traditional free-style response provided by the manual agent to the customer directly, the standardized response provided by the system to the customer is not affected by many factors including the manual agent's emotion, gland, accent, and operational proficiency, thereby further guaranteeing the stability of the customer experience.

Moreover, a standardized natural expression-standard expression-standard response database can be established through the automatic learning, training, and manual aided understanding of the system (robot), so as to implement the automatic understanding and response of the system step by step. In addition, the natural expression data in the database may also have the advantages including a small particle size, a narrow scope of business, and a high data fidelity, so as to reduce the training difficulty of the robot, and shorten the maturation period of the robot intelligence.

Figure 3:
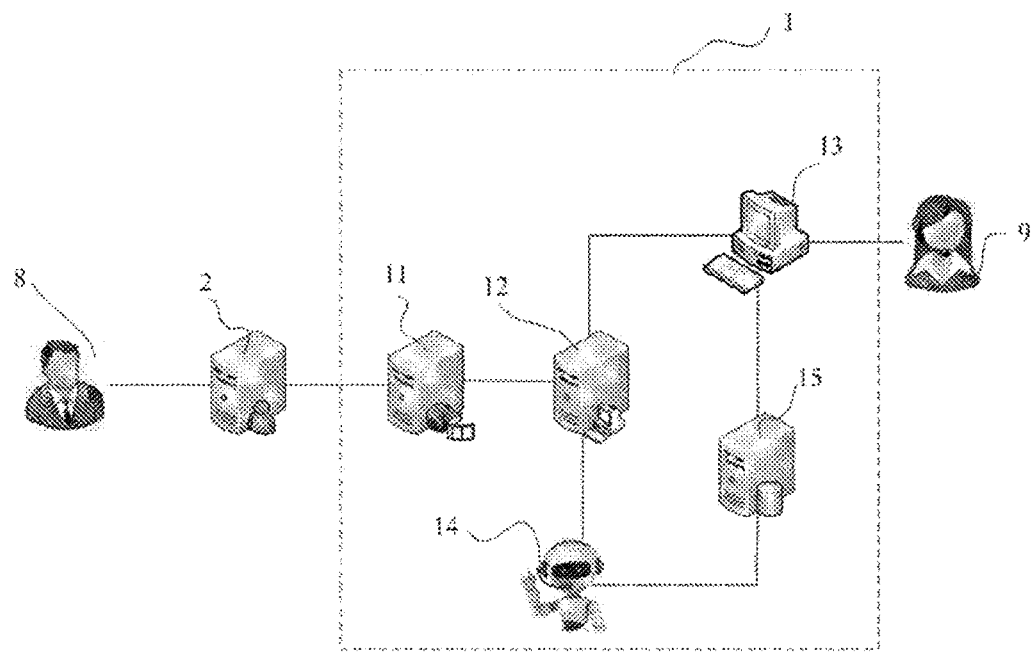
FIG. 3 schematically shows an intelligent response system according to the embodiments of the present invention.

FIG. 3 schematically shows an intelligent response system according to the embodiments of the present invention. As shown in FIG. 3, the intelligent response system includes an intelligent response device 1 (equivalent to the server side) and a calling device 2 (equivalent to the client side), a customer 8 communicates with the intelligent response device 1 through the calling device 2, and an MAU manual agent 9 (a system service personnel) performs manual operation on the intelligent response device 1. Herein, the intelligent response device 1 includes a dialogue gateway 11, a central controller 12, an MAU workstation 13, and a robot 14. Optionally, the intelligent response device 1 further includes a trainer 15.

The customer 8 refers to an object of remote sales and remote service of the institution. The remote sales usually refer to that the institution actively contacts the customer in the form of "calling out" through its dedicated telephone or Internet channels, and attempts to promote sales for their products and services. The remote services usually refer to that the customer of the institution actively contacts the institution in the form of "calling in" through the dedicated telephone or Internet channels of the institution, and inquires or uses the products and services of the institution.

The calling device 2 is a dedicated telephone or Internet channel established by the institution, for performing remote sales (calling-out service) on the customer 8 and providing remote services (calling-in services) to the customer. The telephone channel call system, for example an automatic call distribution (ACD) system (for example, ACD of the Avaya), is a conversation channel for the institution to interact with the customer 8 in the form of speech through an automatic business system (for example, a traditional IVR system based on the telephone key technique, or a novel voice portal (VP) system based on an intelligent speech technique) and a manual agent at the background.

The Internet channel call system, for example an Internet call center (ICC) system based on the instant messaging (IM) technique, is a conversation channel for the institution to interact with the customer 8 in the form of text, speech, image, video, or others through a customer self-service system (for example, a natural language processing (NLP) system) and a manual agent at the background.

The intelligent response device 1 enables the institution to control the automatic business system and the manual agent at the background, as well as the conversation with the customer 8 in the form of text, speech, image, video, or other multimedia forms, thus achieving standardized and automatized interactive conversation between the institution and the customer.

The dialogue gateway 11 plays a role of "preposed portal" in the intelligent response device 1, and the main functions thereof include: receiving the irregular natural expression (in the form of text, speech, image, and video) and the regular non-natural expression (e.g., in the form of telephone keyboard keys) from the customer 8 via the calling device 2, and transmitting them to the central controller 12 for subsequent processing; receiving the instructions from the central controller 12, thereby achieving the response to the expression of the customer 8 (in the form of text, speech, image, video, program, or other forms).

Figure 4:
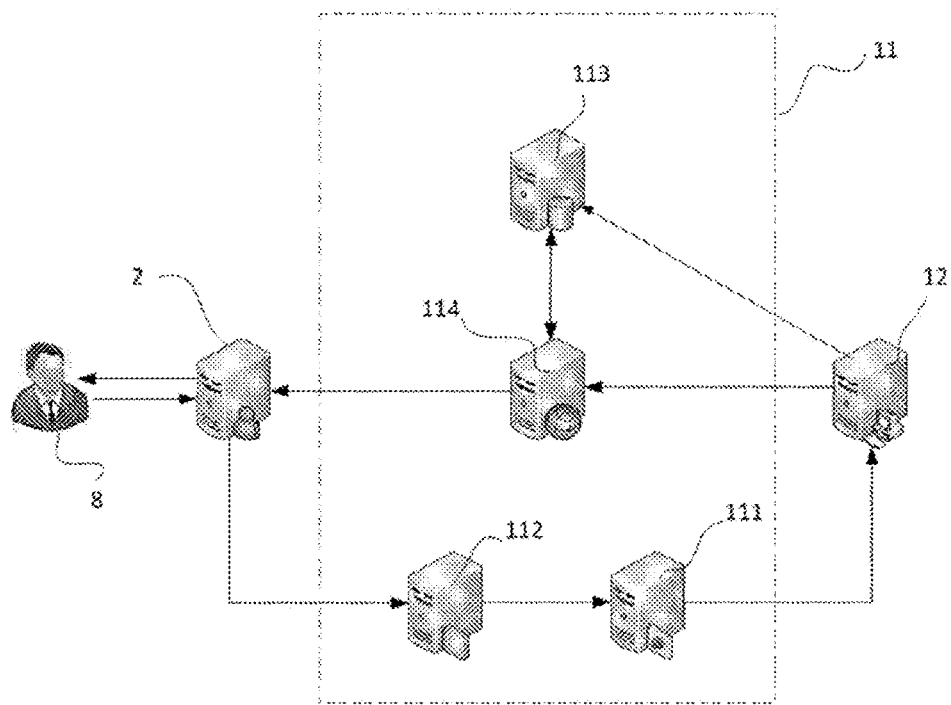
FIG. 4 further shows a part of an intelligent response device in the system of FIG. 3.

As shown in FIG. 4, the dialogue gateway 11 includes an expression receiver 111, an identity authenticator 112, a response database 113, and a response generator 114.

The expression receiver 111 receives an expression from the customer 8 via the calling device 2. The expression may be the aforementioned various irregular natural expressions and regular non-natural expression.

Optionally, the identity authenticator 112 is arranged before the expression receiver 111. The identity authenticator 112 may identify and verify the identity of the customer in the initial stage of the conversation. A traditional "password input" technique (such as: a telephone key input password, a keyboard input website login password, and so on) can be adopted; a novel "pass-phrase+voice-print identification" technique can also be adopted; and the above two techniques can be mixed for use. Although the traditional password authentication technique is not convenient, it has long been widely accepted and commonly used by the market, and can be taken as a primary customer's identity identification and verification means on a critical sensitive conversation node (for example, bank transfer); although the latter is much more convenient, but it has not been widely accepted and commonly used by the market, and can be used as a completely new customer's identity identification and verification means for greatly improving the customer's experience on a non-critical sensitive conversation node (for example, querying shopping points), and can also be used as an aided identification and verification means for enhancing the security of the former on the critical sensitive conversation node.

The identity authenticator 112 is set, and the "pass-phrase+voice-print identification" customer's identity identification and verification means is adopted, such that the customer's experience is improved, and the customer no longer needs to further remember multiple different passwords; the security risk that the password may be stolen in the "password input" traditional method is reduced; in addition, the "pass-phrase+voice-print identification" method is mixed with the "password input" traditional method for use, which can be widely accepted by the market, and can further enhance the security of customer's identity identification and verification.

The response database 113 stores the response data for responding to the customer. Similar to those listed in the above table as examples, the data may include many of the following types:

Text: pre-programmed text, for example, text answers in an online bank FAQ (frequently asked questions).

Speech: pre-recorded live recording, or the TTS speech synthesis recording without variables, for example: "Hello, Here is the future Bank. Is there anything I can do for you?"

Image: pre-made image, for example, the Beijing subway network image. Non-video animation is also included, for example: GIF files, FLASH files, and the like given by the bank for introducing to the customer how to perform the international remittance operation in an online bank system.

Video: pre-made video, for example, the one given by an electric iron supplier for demonstrating to the customer how to use its new products.

Programs: a series of re-programmed instructions, for example, when a customer speaks to express "I want to watch the China Partners", an iCloud smart TV operates according to the requirements of the customer to respond to the customer: firstly turn on the TV, and download and cache the movie Chinese partners automatically for the iCloud server side, and finally start playing.

Template: filled with variable text, speech, image, program templates.

The response generator 114 receives instructions of the central controller 12, and generates a response to the expression of the customer 8 by invoking and/or running the data in the response database 113. Specifically, in accordance with the standard response ID in the instructions, the response data is queried and invoked from the response database 113, or text and image are displayed, or speech and video are played, or a program is conducted; alternatively, a template is invoked from the response database 113 according to the instructions and the variable parameters transmitted in the instructions are filled, or the TTS speech synthesis generated in real time is played (for example, "You have successfully repaid 5000 Yuan to the credit card", wherein, the "5000" is a variable in the instructions), or a paragraph of text is displayed, or an image or animation is generated in real time is displayed, or a segment of program is executed.

Optionally, the central controller 12 may maintain and update the data in the response database 113, including response data, a standard response ID, and so on.

The central controller 12 receives the customer's requirement expression information from the expression receiver 111 (including: irregular natural expression and regular non-natural expression), and cooperates with the robot 14, as well as an MAU manual agent 9 via an MAU workstation 13, to convert the irregular natural expression information of the customer in accordance with the aforementioned method to a standard expression, determines a corresponding standard response ID according to the standard expression, and then transmits the standard response ID to the response generator 114. Optionally, the central controller 12 may update the data in the MT training dataset.

The robot 14 is an application robot for implementing the above artificial intelligence technique. The robot 14 may implement the conversion on text information, speech information, image information, video information, and other natural expressions (the language information), to obtain a standard expression (the Y language information). As previously stated, when the understanding ability of the robot 14 reaches a certain level, for example, when it is determined that the understanding ability is mature within a certain specific category, the conversion of A→X→Y may be performed independently, without any aid of the manual agent. The MT training dataset may be arranged in the robot 14, or may be an external database, and the requirement codes of the standard expression data stored therein (the language on the right side) may be associated with the standard response ID. The database may be updated by the central controller 12. In addition, the database for use in text translation, speech identification, image identification, video processing, and so on may be an external database, and may also be arranged in the robot 14.

The MAU workstation 13 is an interface between the intelligent response device 1 and the MAU manual agent 9. The MAU workstation 13 presents the identified natural expression or the original expression of the customer to the MAU manual agent 9. The MAU manual agent 9 inputs or selects the standard expression through the MAU workstation 13, and the MAU workstation 13 transmits the standard expression to the central controller 12. Optionally, if the response needs to be determined with manual aid, the MAU manual agent 9 inputs or selects the response (or the standard response ID) through the MAU workstation 13.

Optionally, the intelligent response device 1 further includes a trainer 15. The trainer 15 is configured to train the ability of the robot 14 to convert the natural expression into the standard expression. For example, the trainer 15 trains the robot 11 by using the determination result of the MAU manual agent 9, thereby constantly enhancing the accuracy rate of the understanding of the robot 11 in various categories (for example, the aforementioned business category and secondary business category, etc.). For each category, in the case where the accuracy rate of the understanding of the robot cannot reach "a maturation threshold of the understanding of the robot", the trainer 15 performs comparison processing between the conversion result of the standard expression of the MAU manual agent 9 and the conversion result of the standard expression of the standard expression of the robot 11, and if the two results are the same, the "number of times of accurate determination of the robot" and the "number of times of determination of the robot" within the category are correspondingly increased by 1; otherwise, the result of the manual conversion is added into the MT training dataset, as new robot training data. The trainer 15 may also instruct the robot 14 to conduct the aforementioned "self-learning".

In addition, the trainer 15 may also be configured to train the robot 14 in terms of text translation, speech identification, image identification, video processing, and other artificial intelligence techniques. The trainer 15 may also maintain or update the MT training dataset, and the database for use in text translation, speech identification, image identification, and video processing.

Optionally, the trainer 15 may also be integrated with the central controller 12.

Optionally, the response generator 114 and the response database 113 may be independent of the dialogue gateway 11, and may also be integrated in the central controller 12.

The intelligent response device 1 can implement the aforementioned natural expression processing and response method. For example, the dialogue gateway 11 receives, from the calling device 2, the irregular natural expression information from the customer 8 via the expression receiver 111, and transmits it to the central controller 12; the central controller 12 instructs the robot 11 to identify the irregular natural expression information as a certain form of language information which can be processed by a computer and related expression information, and then instructs the robot 11 to convert the language information and the related expression information to the standard expression; if the understanding of the robot 11 is not sufficiently mature or corpus matching is not matched, thereby failing to complete the conversion to the standard expression, the central controller 12 instructs the MAU workstation 13 to prompt the MAU manual agent 9 to conduct a manual conversion to the standard expression; the MAU manual agent 9 converts the language information and the related expression information identified by the robot 11 to the standard expression, which is input and transmitted to the central controller 12 via the MAU workstation 13. Optionally, the MAU manual agent 9 may directly convert the non-identified irregular natural expression information into a standard expression; the central controller 12 queries an expression-response database, to retrieve a standard response ID matching the standard expression, and if there is no matching result, further prompts the MAU manual agent 9 via the MAU workstation 13 to select the standard response and input a corresponding standard response ID; optionally, the MAU manual agent 9 may also directly associate the standard expression with the response data, or establish new response data; the central controller 12 instructs the response generator 114 to invoke and/or run the data in the response database 113 to generate a response to the expression of the customer 8; then, the dialogue gateway 11 feeds back the response to the customer 8 via the calling device 2; optionally, the central controller 12 respectively maintains and updates the MT training dataset or the response database according to the standard expression or the standard response determined or added by the MAU manual agent 9, and accordingly maintains and updates the expression-response database.

Figure 5:
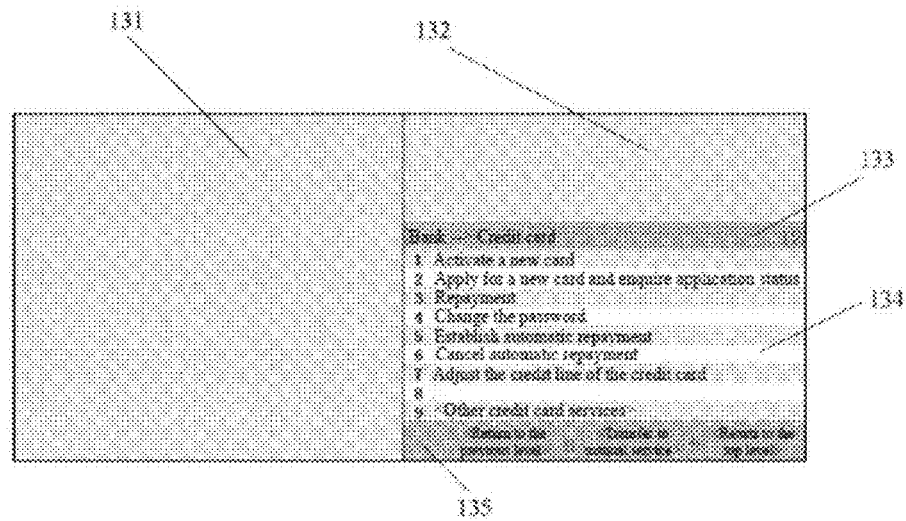
FIG. 5 schematically shows an example of an operation interface presented by an MAU workstation to a manual agent.

FIG. 5 schematically shows an example of an operation interface presented by the MAU workstation to the MAU manual agent 9. As shown in FIG. 5, the operation interfaces of the MAU workstation 13 include: a customer's expression display region 131, a conversation state display region 132, a navigation region 133, a category selection region 134, and a shortcut region 135.

The customer's expression display region 131 shows the natural expression of the customer, and for example, is rendered as the forms such as text converted from text, image, or speech.

The conversation state display region 132 displays conversation real-time state information between the customer 8 and the MAU manual agent 9 or the robot 14, such as: To and fro times of conversation, total conversation duration, customer information, and so on. The display region may also be not arranged.

The navigation region 133 shows the category that the MAU manual agent 9 currently selects to arrive at. The left side of the region displays the text version of the current category path (as shown in the drawings: Bank→Credit card), the right side displays the code corresponding to the category (as shown in the drawings: "12" and "1" stand for the category "Bank", "2" stands for the next level of category "Credit card" in the category "Bank". Unlike the preceding examples, in this application, "1" stands for the category "Bank", rather than "BNK", which has the same identification function).

The category selection region 134 is provided for the MAU manual agent 9 to select the next level of category. As shown in the drawings: the MAU manual agent 9 has entered the next level of category "Credit card" of the category "Bank", and 7 subcategories are administered under this level of category "Credit card": "Activate a new card", "Apply for a new card and enquire application status", "Repayment" and so on. If the expression of the customer 8 is "The overdraft limit of my credit card is too low", the MAU manual agent 9 selects "7" in the current category "bank→credit card", the navigation region updates to display "bank→credit card→Adjust the credit line . . . 127", and then enters the further next level of category. The MAU manual agent 9 may also directly input "127" on the keyboard after seeing the expression of the customer 8, to reach the target category "bank→credit card→Adjust the credit line". In this way, the customer 8 no longer needs to spend a lot of time traversing the complex functional menu tree to find out the desired self service, but simply speak out his demands, such that the MAU manual agent 9 can quickly help the customer to directly start the processing "Adjust the credit line of the credit card". Thus, the user's experience becomes easier and more convenient, and the self-service process utilization rate of the existing traditional IVR system will be increased significantly.

The shortcut region 135 provides commonly used shortcut keys for the MAU manual agent 9, for example, "–" for returning to the previous level of category, "0" for transferring to the manual agent, and "+" for returning to the top level of category (which is the root category "Bank" in this case). The shortcut region 135 may also provide other shortcuts for the MAU manual agent 9. The shortcut region 135 may increase the processing speed of the MAU manual agent 9. The shortcut region 135 is also an optional arrangement region.

Here merely gives one example of the operation interface of the MAU workstation 13, which is used for the conversion processing of the MAU manual agent 9 on the standard expression. Similar operation interfaces may also be used to conduct the manual processing on the response.

The intelligent response device according to the embodiments of the present invention may be implemented by one or more computers, a mobile terminal, or other data processing devices.

In the natural expression processing and response method, device, and system according to the embodiments of the present invention, the standard expression can be used to quickly point to the response, such that the customer no longer needs to spend a lot of time traversing the complicated routine menu of functions to find out the desired self-service.

A standardized natural expression information-standard expression-standard response database can be established through the automatic learning, training, and manual aided understanding of the robot, so as to implement the automatic understanding and response of the system step by step. In addition, the natural expression data in the database may also have the advantages including a small particle size, a narrow scope of business, and a high fidelity, so as to reduce the training difficulty of the robot, and shorten the maturation period of the robot intelligence.

Unlike the traditional response mode, the manual operation is mainly limited to the "decision" at the background, which includes determining the requirement codes of the standard expression (the Y language information), and selecting a response (or a response ID) or generating a response operation, without the need of direct communication with the customer at the foreground by phone or by means of text input (other than inputting the requirement parameters of the standard expression (the Y language information)). Thus, a large amount of human efforts can be saved, and the working efficiency can be increased. In addition, as compared with the traditional free-style response provided by the traditional manual agent to the customer directly, the standardized response provided by the system to the customer is not affected by many factors including the manual agent's emotion, gland, accent, and operational proficiency, thereby further guaranteeing the stability of the customer experience.

In addition, the self-learning, training, and mature degree evaluation can be implemented in each individual specific business category (node), so as to achieve the intelligence of the whole system point by point. In practical applications, the mechanism "the understanding of the robot becomes mature point by point" is more likely to be approved and accepted by the institutions, because the risk is relatively low, the cost for reconstructing the old system cost is not high, and no negative impact will be generated on the daily operations.

The above are only exemplary embodiments of the present invention, and not intended to limit the scope of protection of the present invention, which is defined by the appended claims.

The invention claimed is:
1. A computer-implemented method, comprising:
  receiving, by a central controller computing device, a natural expression input, wherein the natural expression input is obtained via an interface of a client device and comprises a first form of language information;
  identifying, by a robot computing device, a natural expression by converting the natural expression input to a second form of language information that can be processed by a computer; and
  converting, by the robot computing device or manual aided understanding (MAU) workstation, the identified natural expression in the second form of language information to a standard expression in an encoded form, wherein converting the second form of language information to the standard expression comprises:
    determining whether an understanding of the robot is mature based at least in part on an accuracy rate of the understanding of the robot over a certain time interval;
    when it is determined that the understanding of the robot is mature, performing machine conversion to determine the standard expression;
    when it is determined that the understanding of the robot is not mature the machine conversion, coordinating with the MAU workstation to perform manual conversion processing to determine the standard expression; and
    outputting the standard expression of either the machine conversion or the manual conversion.
2. The computer-implemented method of claim 1, wherein, the standard expression includes requirement codes.
3. The computer-implemented method of claim 2, wherein, the requirement codes are represented by digital codes.

4. The computer-implemented method of claim 2, wherein, the standard expression further includes requirement parameters further embodying user-specified requirements.

5. The computer-implemented method of claim 4, wherein, the conversion of the natural expression input to the second form of language information is constituted by language information units obtained through spotting and conversion performed on the natural expression in the form of speech by using a modeling tool.

6. The computer-implemented method of claim 2, wherein, the conversion of the natural expression input to the second form of language information is constituted by language information units obtained through spotting and conversion performed on the natural expression in the form of speech by using a modeling tool.

7. The computer-implemented method of claim 1, wherein, the conversion of the natural expression input to the second form of language information is constituted by language information units obtained through spotting and conversion performed on the natural expression in the form of speech by using a modeling tool.

8. The computer-implemented method of claim 7, wherein, the second form of language information is constituted by one of phonemes, characters, and phrases.

9. The computer-implemented method of claim 7, wherein, conversion from the second form of language information to the standard expression is implemented on the basis of machine translation (MT) training dataset between the language information and the standard expression.

10. The computer-implemented method of claim 1, wherein, the second form of language information is constituted by one of phonemes, characters, and phrases.

11. The computer-implemented method of claim 1, wherein, conversion from the second form of language information to the standard expression is implemented on the basis of machine translation (MT) training dataset between the language information and the standard expression.

12. The computer-implemented method of claim 1, wherein, additional information associated with the natural expression is obtained during the identification of the natural expression, and the additional information is converted to a part of the standard expression.

13. The computer-implemented method of claim 1, further comprising:
wherein the identifying of the natural expression, is performed to further obtain relevant expression type information; and
wherein converting the natural expression in the second form of language information to the standard expression comprises:
determining whether the identified natural expression and the expression type information can be converted into an encoded standard expression through machine conversion
if it is determined that the desired standard expression cannot be obtained through the machine conversion, performing manual conversion processing;
invoking or generating a standard response matching with the standard expression of the machine conversion or the manual conversion; and
outputting the generated standard response in the manner of corresponding to the expression type information.

14. The computer-implemented method of claim 13, wherein, the standard response is fixed data pre-stored in a database, or the standard response is generated on the basis of variable parameters and basic data of the standard response pre-stored in the database.

15. A computing system comprising:
a dialogue gateway, a central controller, a manual aided understanding (MAU) workstation, a robot, an expression database, a response database, and a response generator;
wherein the dialogue gateway is configured to receive natural expression input obtained via an interface of a client device, to transmit the natural expression input to the central controller for subsequent processing, and to transmit a response to the natural expression input to the client device;
wherein the central controller is configured to receive the natural expression input from the dialogue gateway, to coordinate operation of the robot and the MAU workstation, to convert the natural expression input to a standard expression, and to instruct the response generator to generate a standard response corresponding to the standard expression;
wherein the robot is configured to, in response to the instruction of the central controller, process the natural expression input to identify the natural expression, by conversion of the natural expression input to language information that can be processed by a computer, and to convert the language information to the standard expression using the expression database;
wherein the MAU workstation is configured to present either the identified natural expression or the natural expression input via a manual-agent interface, to receive the standard expression in input data received via the manual-agent interface, and to transmit the standard expression to the central controller;
wherein the expression database is configured to store expression-related data comprising: language information data associated with the natural expression, standard expression data associated with the standard expression, and data associated with a relationship between the language information and the standard expression;
wherein a response database stores response-related data, including standard response data for invocation, data for generating the response, or both; and
wherein the response generator is configured to receive instructions of the central controller, and to generate the response to the natural expression input using the data in the response database.

16. The computing system of claim 15, wherein, the central controller updates the expression database, the response database, or both.

17. The computing system of claim 15, further comprising a trainer device configured to train the robot to convert the natural expression into the standard expression.

18. The computing system of claim 15, wherein, the dialogue gateway further comprises an identity authenticator configured to identify and verify the user's identity before receiving the natural expression, wherein authentication methods for the identification of a user at least include pass-phrase plus voice-print identification.

* * * * *